United States Patent
Patel et al.

(10) Patent No.: US 10,461,856 B2
(45) Date of Patent: *Oct. 29, 2019

(54) WIRELESS TRANSMISSION OF SERVER STATUS INFORMATION

(71) Applicant: Lenovo Enterprise Solutions (Singapore) Pte. Ltd., Singapore (SG)

(72) Inventors: Pravin Patel, Cary, NC (US); Theodore Brian Vojnovich, Raleigh, NC (US); Gregory B. Pruett, Raleigh, NC (US); Luke Remis, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,892

(22) Filed: Dec. 17, 2018

(65) Prior Publication Data

US 2019/0123822 A1 Apr. 25, 2019

Related U.S. Application Data

(63) Continuation of application No. 15/590,872, filed on May 9, 2017, now Pat. No. 10,193,623.

(51) Int. Cl.
*H04B 10/114* (2013.01)
*H04W 76/14* (2018.01)

(52) U.S. Cl.
CPC ..... *H04B 10/1143* (2013.01); *H04B 10/1149* (2013.01); *H04W 76/14* (2018.02)

(58) Field of Classification Search
CPC ... H04B 10/1143; H04W 76/14; H04W 76/23
USPC ....................................................... 398/115
See application file for complete search history.

(56) References Cited

U.S. PATENT DOCUMENTS 9,441,979 B2 * 9/2016 Barnard ............. H05B 37/0272
2011/0231478 A1 * 9/2011 Wheeler ........... G06F 17/30864
709/203

* cited by examiner

*Primary Examiner* — Juan A Torres
(74) *Attorney, Agent, or Firm* — Zilka-Kotab, P.C.

(57) ABSTRACT

A system, according to one embodiment, includes: a wireless communication device operable to establish a wireless connection and transmit server status information over the wireless connection. The system also includes an optical sensor which is operable to detect optical signals from an optical source of a server. The wireless communication device and the optical sensor are coupled together by a physical or wireless connection. Other systems, methods, and computer program products are described in additional embodiments.

20 Claims, 6 Drawing Sheets

WIRELESS TRANSMISSION OF SERVER STATUS INFORMATION

FIELD OF THE INVENTION

The present disclosure relates to the server management, and more particularly, to detecting server status information using optical sensors, and the transmission of the server status information.

BACKGROUND

A server typically includes a computer program or a device that provides functionality for other programs or devices. This style of architecture allows for a single computation to be distributed across multiple processes or devices. As such, servers can provide various functionalities.

Moreover, remote access to, and/or control over, a server is typically achieved by coupling the server to an Ethernet access connection. However, multiple servers may be stored in a given server rack (or chassis), where some racks are able to hold 40 servers or more. Thus, a rack storing 40 servers may have 40 wired Ethernet connections, each leading to a switch somewhere in the rack.

A mid-level server typically includes a baseboard management controller (BMC) which is responsible for checking and reporting the health of the server. The BMC from one vendor to the next may have different interfaces for the user to access the error information, or in some cases, the error information is not accessible at all from the BMC. Each server vendor designs the BMC with a different set of capabilities and interfaces, making the access of error information often vendor-specific. There are common interfaces, such as Intelligent Platform Management Interface (IPMI), that generally cover errors but may not report all errors asserted by the operating system, e.g., such as Peripheral Component Interconnect Express (PCIe) slot errors for a Non-Volatile Memory Express (NVMe) drive. Furthermore, for ultra-low-end servers, there may not even be a BMC in the server (e.g., such as for desktop-class servers), and therefore there is no ability to access out-of-band errors.

Each of the servers also typically include light indicators, e.g., light emitting diodes (LEDs), integrated with the outer surface of a housing thereof. Each of the light indicators correspond to a particular aspect of the associated server, and may thereby be used to display different statuses of a server by selectively outputting optical signals from the light indicators. Thus, it is often easier for a user (e.g., such as the datacenter administrator) to walk the aisles of a conventional datacenter having a plurality of servers looking for errors rather than attempting to manage the different BMCs associated with the various servers in the datacenter. However, with a large number of servers in a given data center or storage rack thereof, it is exceedingly difficult to efficiently determine what the optical signals of the various light indicators are, much less determine when an optical signal of any of the light indicators on any one of the servers has changed. As such, there is increased likelihood of servers not being serviced properly.

Thus, it would be beneficial to provide systems, methods, computer program products and the like which overcome these server light indicator shortcomings. Accordingly, the ability to efficiently detect and decode the optical signals from multiple light indicators on various servers in a rack is desirable.

SUMMARY

A system, according to one embodiment, includes: a wireless communication device operable to establish a wireless connection and transmit server status information over the wireless connection. The system also includes an optical sensor which is operable to detect optical signals from an optical source of a server. The wireless communication device and the optical sensor are coupled together by a physical or wireless connection.

A computer program product, according to another embodiment, includes a non-transitory computer readable storage medium. The computer readable storage medium has program code stored thereon. Furthermore, the program code is executable by a computer to cause the computer to perform a process which includes: establishing, by a wireless communication device, a wireless connection between a mobile device and the wireless communication device. The wireless communication device is coupled to an optical sensor and the optical sensor is positioned to detect optical signals from an optical source of a server. Moreover, server status information corresponding to optical signals detected by the optical sensor is received, by the wireless communication device. The server status information is further transmitted, by the wireless communication device, to the mobile device via the wireless connection.

A computer program product, according to yet another embodiment, includes a non-transitory computer readable storage medium. The computer readable storage medium has program code stored thereon. Furthermore, the program code is executable by a computer to cause the computer to perform a process which includes: receiving, by a device, representations of optical signals detected by an optical sensor. The optical sensor is positioned to detect optical signals from an optical source of the server. Moreover, the representations of the optical signals are decoded, by the device, to determine server status information corresponding to a server.

Other aspects and advantages of the present invention will become apparent from the following detailed description, which, when taken in conjunction with the drawings, illustrate by way of example the principles of the invention.

DETAILED DESCRIPTION

Figure 1:
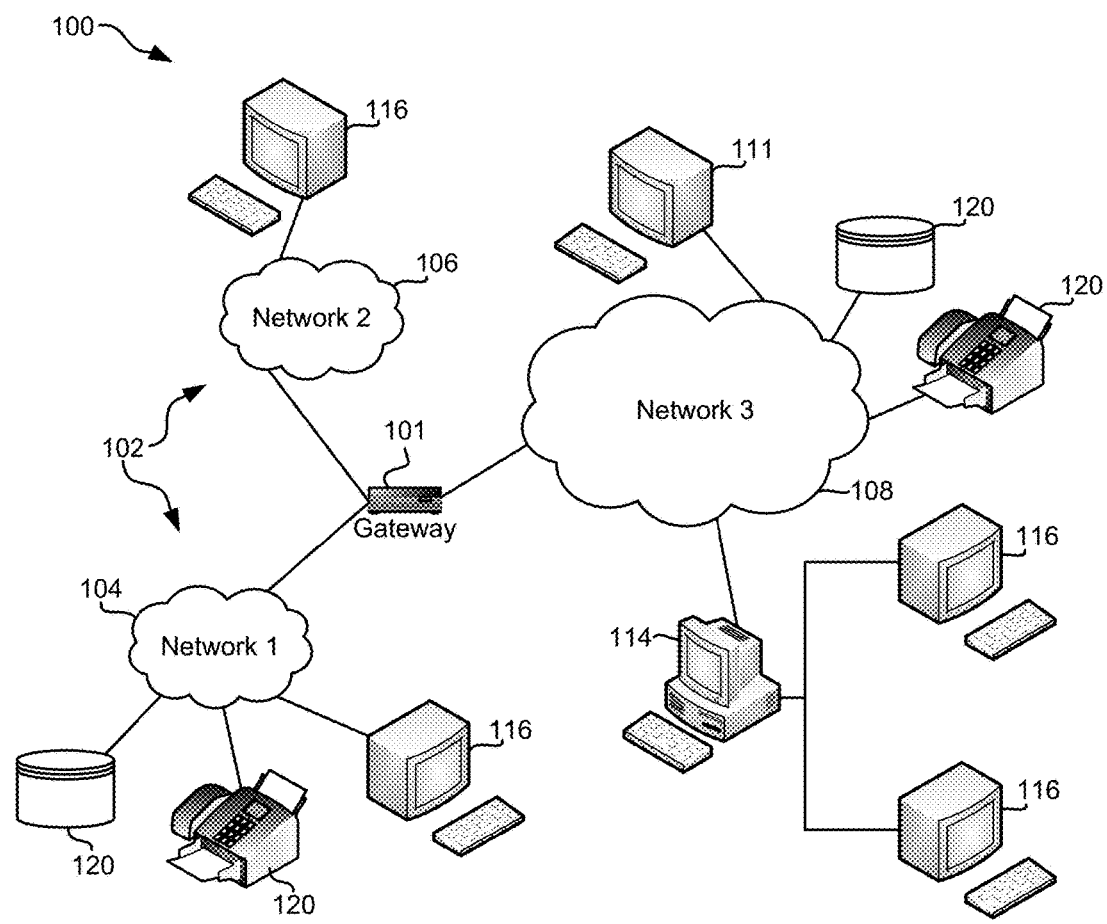
FIG. 1 is a schematic drawing of a computer network environment, according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of efficiently detect and decode the optical signals from multiple light indicators on various servers and/or related systems and methods. Accordingly, some of the embodiments described herein introduce the ability to manage multiple servers in a rack. Moreover, wireless connections to systems implementing such optical sensors may further introduce the ability to manage multiple servers in a rack without physically inspecting each one, as will be described in further detail below.

In one general embodiment, a system includes: a wireless communication device, and one or more optical sensors. The wireless communication device and the one or more optical sensors are coupled together by a physical or wireless connection, and the wireless communication device is operable to establish a direct wireless connection and transmit server status information over the direct wireless connection. Furthermore, the one or more optical sensors are operable to detect optical signals from one or more optical sources of one or more servers.

In another general embodiment, a method includes: establishing, by a wireless communication device, a direct wireless connection between a mobile device and the wireless communication device, the wireless communication device being coupled to one or more optical sensors, receiving, by the wireless communication device, server status information corresponding to optical signals detected by the one or more optical sensors, and transmitting, by the wireless communication device, the server status information to the mobile device via the direct wireless connection. The one or more optical sensors are positioned to detect optical signals from one or more optical sources of one or more servers.

In yet another general embodiment, a method includes: receiving, by a device, representations of optical signals detected by one or more optical sensors, and decoding, by the device, the representations of the optical signals to determine server status information corresponding to one or more servers. The one or more optical sensors are positioned to detect optical signals from one or more optical sources of the one or more servers.

General Computing Concepts

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, and data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
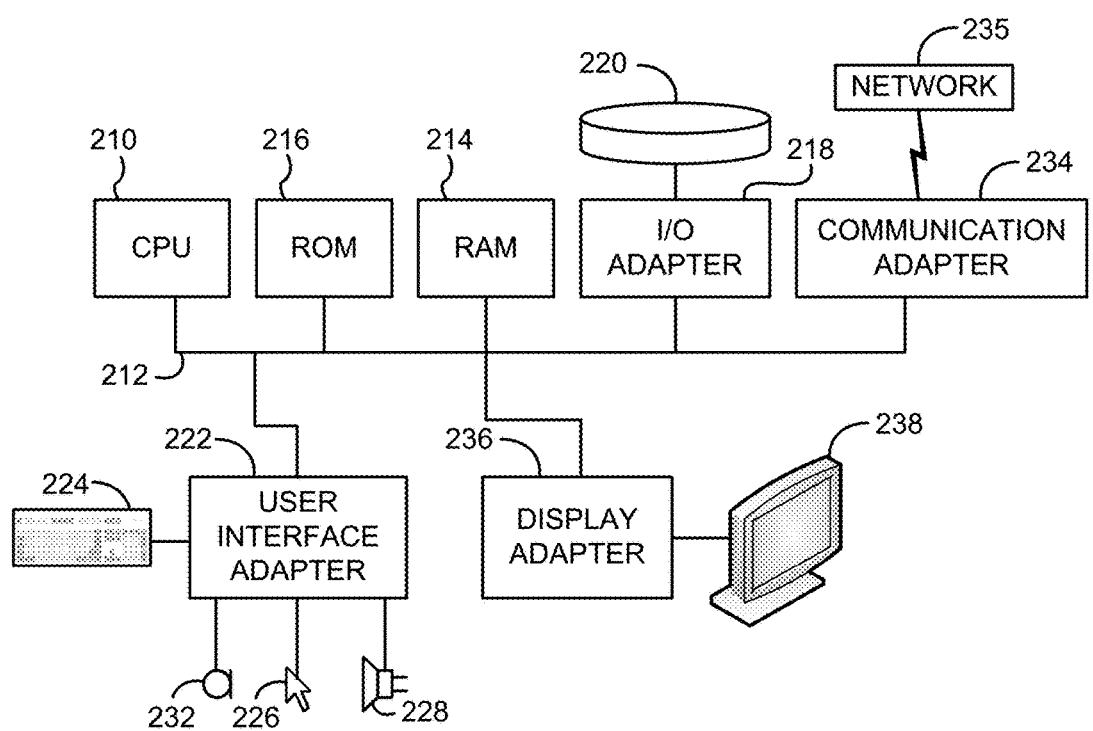
FIG. 2 is a simplified schematic of a computing workstation, according to one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As previously mentioned, a mid-level server typically includes a BMC which is responsible for checking and reporting the health of the server. The BMC from one vendor to the next may have different interfaces for the user to access the error information, or in some cases, the error information is not accessible at all from the BMC. Each server vendor designs the BMC with a different set of capabilities and interfaces, making access to error information often vendor-specific. Moreover, some ultra-low-end servers may not even include a BMC, and therefore do not provide the ability to access out-of-band errors.

In view of the foregoing shortcomings, it is often easier for a user (e.g., such as the datacenter administrator) to walk the aisles of a conventional datacenter having a plurality of servers looking for errors. Servers typically include light indicators (e.g., LEDs) integrated with the outer surface of a housing thereof. Each of the light indicators correspond to a particular aspect of the associated server, and may thereby be used to display different statuses of a server by selectively outputting optical signals from the light indicators. However, different servers from different vendors implement light indicators in varied styles and configurations. With a large number of servers in a given storage rack, it is exceedingly difficult to efficiently determine what the optical signals of the various light indicators are, much less determine when an optical signal of any of the light indicators on any one of the servers has changed for conventional systems that do not have a BMC implemented therein. As such, there is increased likelihood of servers not being serviced properly.

Thus, it would be beneficial to provide systems, methods, computer program products and the like which overcome these conventional shortcomings. Accordingly, the ability to efficiently detect and decode the optical signals from multiple light indicators on various servers in a rack is desirable. The following description discloses several preferred embodiments which introduce the ability to manage multiple servers in a rack by efficiently detecting and decoding the optical signals from multiple light indicators on various servers. Moreover, wireless connections to systems implementing such optical sensors may further introduce the ability to manage multiple servers in a rack without physically inspecting each one, as will be described in further detail below.

Figure 3A:
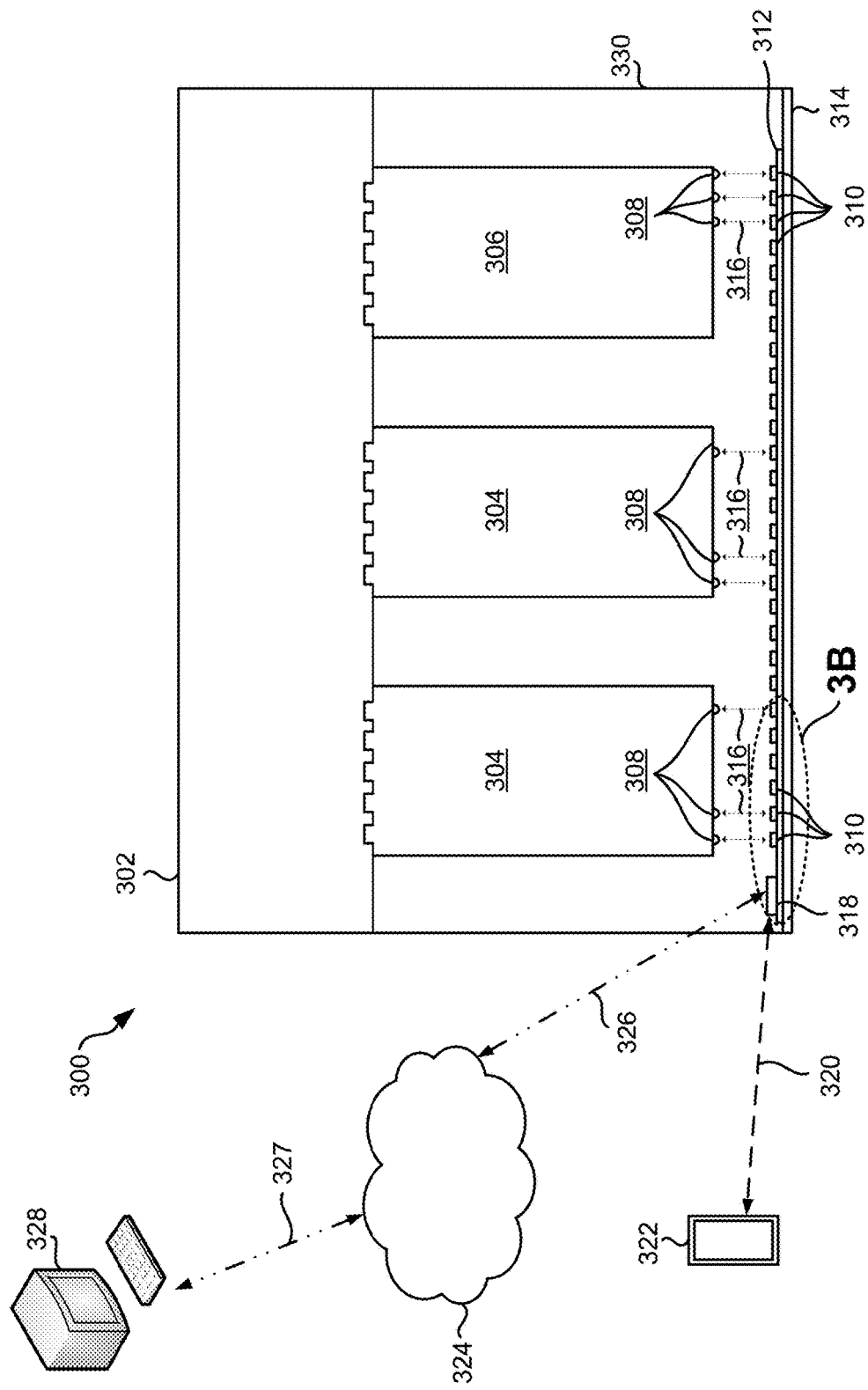
FIG. 3A is simplified schematic view of a system, according to one embodiment.
Figure 3B:
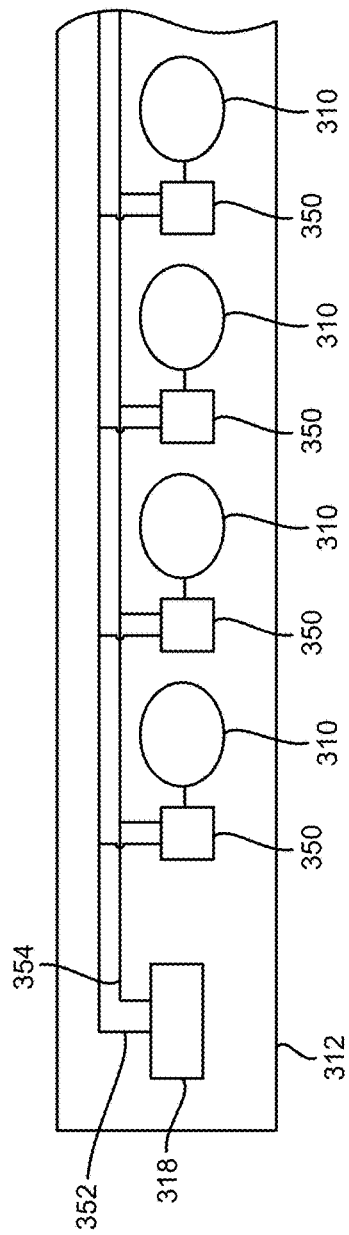
FIG. 3B is a partial detailed view of the system in FIG. 3A taken along line 3B.

Looking to FIGS. 3A-3B, a system 300 is illustrated in accordance with one embodiment. As an option, the present system 300 may be implemented in conjunction with features from any other embodiment listed herein, such as those described with reference to the other FIGS., such as FIGS. 1-2. However, such system 300 and others presented herein may be used in various applications and/or in permutations which may or may not be specifically described in the illustrative embodiments listed herein. Further, the system 300 presented herein may be used in any desired environment. Thus FIGS. 3A-3B (and the other FIGS.) may be deemed to include any possible permutation.

In FIG. 3A, system 300 includes a storage rack 302 which has a plurality of servers 304, 306 coupled thereto. The middle and leftmost servers 304 are designed according to a first format, while the rightmost server 306 is designed according to a second format. As alluded to above, servers having different formats (e.g., corresponding to different vendors) may implement light indicators in varied styles and configurations. Thus, looking to the servers 304 corresponding to the first format compared to the servers 306 corresponding to the second format, optical sources 308 thereof are oriented differently.

The optical sources 308 are integrated with an outer surface of each of the servers 304, 306 according to the respective format. The optical sources 308 may include any desired type of optical signal source capable of emitting an optical signal (e.g., optical light). According to an illustrative approach, one or more of the optical sources 308 may include LEDs that are capable of emitting optical light at any desired frequency, wavelength (color), intensity (e.g., brightness), etc. In some approaches, the absence of an optical signal may be detected and used to convey server status information. Each of the optical sources 308 may correspond to one or more particular aspects of an associated server, and may thereby display optical signals which correspond to server status information related to the one or more particular aspects. For example, one of the optical sources 308 may correspond to the status of a power supply of the associated server, and the optical source 308 emits a solid (steady) green light (optical signal) while the server is receiving sufficient power. However, when the server is no longer receiving a sufficient supply of power, the optical source 308 may emit a flashing red light. According to other examples, an optical signal emitted by specific ones of the optical sources 308 may correspond to the status of the physical connection between the respective server and a storage drive, the status of a wireless connection established by a wireless module (not shown) in the respective server, an error message corresponding to any one or more of the components included in the respective server, etc., or any other desired server status information. It follows that the optical sources 308 may thereby be used to display different statuses of the various aspects of the server by selectively outputting optical signals which correspond to the server status information.

As shown, system 300 further includes a plurality of optical sensors 310, each of which may be operable to detect optical signals emitted from respective ones of the optical sources 308 of the servers 304, 306. According to some approaches, at least one of the optical sensors 310 may include a photo sensing diode of a type known in the art. However, one or more of the optical sensors 310 may include any other type of optical light detecting sensor which would become apparent to one skilled in the art upon reading the present description. Thus, in some approaches, at least one of the optical sensors 310 may be operable to detect light emitted from an LED.

In preferred approaches, one or more of the optical sensors 310 are positioned such that they are in a line-of-sight of the optical sources 308 in order to detect optical signals emitted by the optical sources 308. Accordingly, the optical sensors 310 may be coupled to an inner surface of an enclosure adjacent the servers 304, 306, e.g., a door, a back wall, a shelf, etc. In the present embodiment, the optical sensors 310 are coupled to a tape 312 which is in turn coupled to an inner surface of a door 314 to an enclosure 330 in which the servers 304, 306 are stored. As shown, a subset of the optical sensors 310 are in a direct line-of-sight of the optical sources 308, where the line of sight is represented by the arrows 316 extending therebetween. The optical sensors 310 are preferably spaced on the tape 312 such that one or more of the optical sensors 310 are aligned (in a direct line-of-sight) with one or more respective optical sources 308 on each of the servers 304, 306. The optical sensors 310 that are in a direct line-of-sight of the optical sources 308 may thereby detect optical signals emitted by the optical sources 308, as will be described in further detail below.

A wireless communication device 318 is also coupled to the tape 312. The wireless communication device 318 may be operable to establish a direct wireless connection 320 and/or transmit data over the direct wireless connection 320. Accordingly, optical signals (corresponding to server status information) relayed from the optical sources 308 and detected by the optical sensors 310 may be transmitted over the direct wireless connection 320 by the wireless communication device 318. The wireless communication device 318 may be a transceiver, may be a transmit-only device, etc.

Figure 3C:
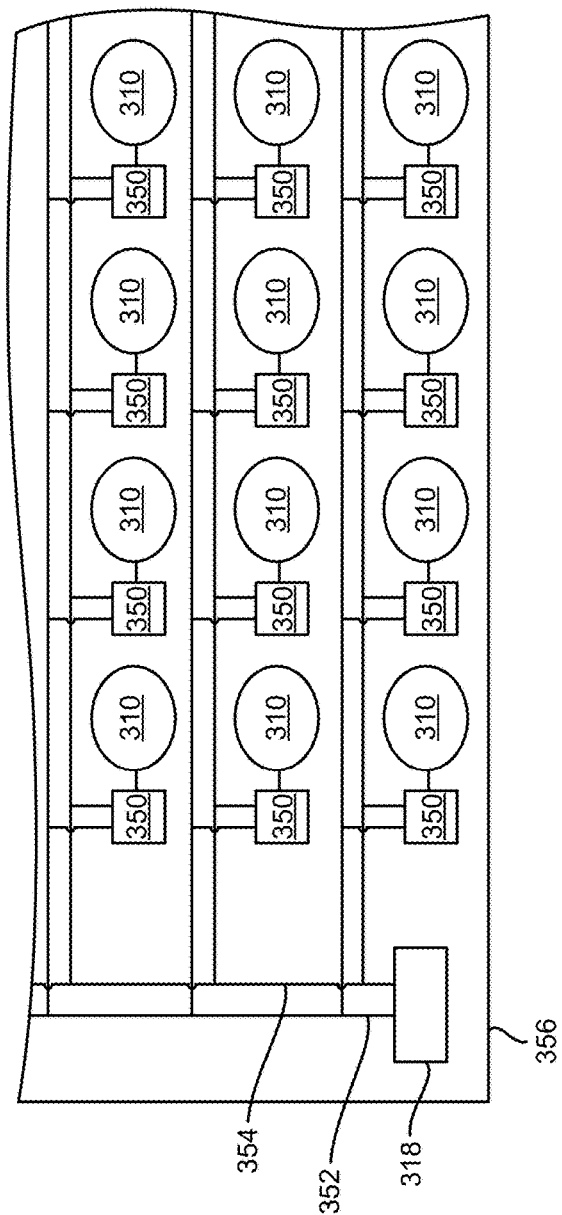
FIG. 3C is a partial detailed view of a sheet having optical sensors, according to one embodiment.

Referring momentarily to FIG. 3B, a detailed schematic view of a portion of the tape 312 and components coupled thereto, is illustrated according to one embodiment. As shown, optical sensors 310 are each coupled to a respective integrated circuit 350 via a physical electrical connection. Moreover, each of the integrated circuits 350 may also be coupled to each other along the length of the tape 312. Although only one array of optical sensors 310 and integrated circuits 350 are shown in the embodiment of FIG. 3B, any configuration of multiple optical sensors 310 and/or integrated circuits 350 may be implemented. For example, looking to FIG. 3C, multiple arrays of optical sensors 310 and integrated circuits 350 may be coupled together on a sheet 356, e.g., as a matrix.

The sheet 356 and/or tape 312 may be electrically configured such that they may be cut down to a desired size without affecting performance of the optical sensors 310 and/or integrated circuits 350 remaining after the cutting. The integrated circuits 350 may be coupled to a common power source 352 (power line) and communication line 354. Both of the common power source 352 and communication line 354 may also be coupled to the wireless communication device 318. The common power source 352 may be used to power each of the integrated circuits 350 and the wireless communication device 318. According to an illustrative approach, a section of tape 312/sheet 356 cut from a supply roll/supply sheet may be soldered to a spliced USB cable that is plugged into a USB port on the front of one of the servers in the rack. The spliced USB cable may thereby supply power to the plurality of components along the tape 312/sheet 356. In another illustrative approach, an alternating current (AC) or direct current (DC) barrel connector may be used to provide power to the plurality of components along the tape 312/sheet 356. Moreover, the communication line 354 may be used to transfer the optical signals detected by the optical sensors 310 to the wireless communication device 318. However, in some approaches the wireless communication device 318 may be coupled to one or more of the integrated circuits 350 and/or optical sensors 310 via a wireless connection which facilitates transfer of the detected optical signals therebetween.

It should be noted that a digital or analog representation of the optical signals detected by the optical sensors 310 is preferably transmitted rather than the optical signals themselves. In other words, the optical signals detected by the optical sensors 310 may not be transmitted along to the integrated circuits 350, the wireless communication device 318, a mobile device 322, etc. as optical signals, but rather as data which represents the optical signals detected. For example, looking to FIG. 3A, the rightmost optical source 308 of the rightmost server 306 may emit a red light which flashes at a frequency of 1 flash per second. The electrical signal (e.g., current, voltage, etc.) produced by the optical sensor 310 as it detects this red, flashing optical signal may serve as the digital or analog representation of the optical signal. Moreover, these electrical signals may be combined with other information such as the identity of the optical sensor 310 which detected the optical signal, the position of the optical sensor 310 which detected the optical signal along the array of optical sensors 310, the x-axis and y-axis location of the optical sensor 310 which detected the optical signal in a matrix of optical sensors 310 (e.g., see FIG. 3C), etc., to form a more complete digital or analog representation of the detected optical signal. The integrated circuits 350 may add such other information.

In some embodiments, the orientation (placement) of each of the optical sensors 310 may be designed to correspond to the specific orientation of optical sources 308 on the servers 304, 306. Accordingly, each of the optical sensors 310 may be oriented such that they detect optical signals from a respective optical source 308. However, in other approaches the strip of tape 312 having an array of optical sensors 310 may be coupled to the inner surface of an enclosure adjacent the servers 304, 306 without aligning any specific ones of the optical sensors 310 with any of the optical sources 308. The optical sensors 310 may be grouped along the strip of tape 312 or sheet 356 with a sufficiently high density (e.g., resolution) such that an optical source 308 may be detected by one or more of the optical sensors 310 without specifically aligning the optical sensors 310 with the optical source 308. It follows that a given optical signal may be detected by more than one optical sensor 310. Accordingly, a controller, processor, the integrated circuits, etc., may determine which optical sensor 310 received the strongest detection of the optical signal and disregard the other detections from the other optical sensors 310 as redundant. In another approach, detection by multiple optical sensors 310 may be used to discern an approximate location of the optical signal.

As described above, optical signals emitted by the optical sources 308 and detected by the optical sensors 310 may correspond to a status of the respective server. Thus, the representation of the detected optical signal may further be decoded to reveal the server status information being relayed by the optical sources 308 via optical signals. Returning to the previous example, the red light emitted by the rightmost optical source 308 of the rightmost server 306 at a frequency of 1 flash per second may be represented by the electrical signals (e.g., current, voltage, etc.) output by the optical sensor 310 that detects it. However, the representation of the optical signal may further be decoded to reveal the server status information included in the detected optical signal. According to the example, the red light flashing from the rightmost optical source 308 of the rightmost server 306 may represent that a processor in the rightmost server 306 has experienced a connection error. Other combinations of flashes, colors, temporal illumination, etc. may represent various states and conditions of the server. For example, the red light flashing two times in rapid succession with a pause between each set of two flashes may represent another type of error, and so on. Detection of a steady light output may indicate no errors. Thus, the integrated circuits 350, the wireless communication device 318, a controller coupled to the wireless communication device 318, a device (e.g., mobile device 322) to which the representation of the optical signal is transmitted to, etc. may decode the representation of the optical signal to determine the corresponding server status information which conveys that a processor in the server 306 has experienced a connection error. It follows that in some approaches, each of the integrated circuits 350 may be operable to decode the representations of the optical signals detected by the respective optical sensors 310 coupled thereto, preferably determining server status information from the decoded optical signals, as will be described in further detail below (e.g., see FIG. 5).

Returning again to FIG. 3A, the wireless communication device 318 again is preferably operable to establish a direct wireless connection 320 with a nearby electrical device. Depending on the desired embodiment, the wireless communication device 318 may establish a direct wireless connection with a wireless controller positioned on one or more of the servers 304, 306, with a wireless module of a nearby electrical device such as a laptop computer, a mobile device 322, etc. In this embodiment, the wireless communication device 318 has established a direct wireless connection 320 with a mobile device 322 that is in close enough proximity. The wireless communication device 318 may establish a direct wireless connection with the mobile device 322 by performing the steps of a predetermined protocol, as would be appreciated by one skilled in the art upon reading the present description. According to various approaches, the wireless communication device 318 may be operable to establish the direct wireless connection between the wireless communication device 318 and the mobile device 322 using any desired protocol, e.g., including Bluetooth, near field communication, Wi-Fi Direct, etc.

Once a direct wireless connection 320 has been established by the wireless communication device 318, representations of optical signals detected by the optical sensors 310 and/or server status information corresponding to the detected optical signals may be sent from the wireless communication device 318 to the mobile device 322 via the direct wireless connection 320. Thus, the server status information is wirelessly transmitted to the mobile device 322 from the wireless communication device 318 without using any physical connection between the mobile device 322 and the wireless communication device 318.

In further approaches, the wireless communication device 318 may be part of a network access point with direct wireless connection capability. Thus, the network access point may also or alternatively be coupled to a data network 324 via a network connection 326. According to one example, which is in no way intended to limit the invention, the wireless communication device 318 may be a Wi-Fi access point with Bluetooth capability, which is operable to bridge the Bluetooth to Wi-Fi, thereby making the wireless communication device 318 accessible by a datacenter network. It follows that the network connection 326 may be utilized to transmit the representations of the optical signals detected by the optical sensors 310 and/or server status information from the wireless communication device 318 to a remote computer 328 also connected to the data network 324 via a respective network connection 327.

As mentioned above, the wireless communication device 318 may be operable to establish a direct wireless connection 320 with a mobile device 322. Furthermore, the direct wireless connection 320 may be used to transmit server status information received from optical sensors. Looking to FIG. 4, a flowchart of a method 400 is shown according to one embodiment. It should be noted that the operations included in method 400 are described as being performed from the perspective of a wireless communication device, e.g., as shown in FIGS. 3A-3B. However, the method 400 may be performed in accordance with the present invention in any of the environments depicted in FIGS. 1-3B, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Figure 4:
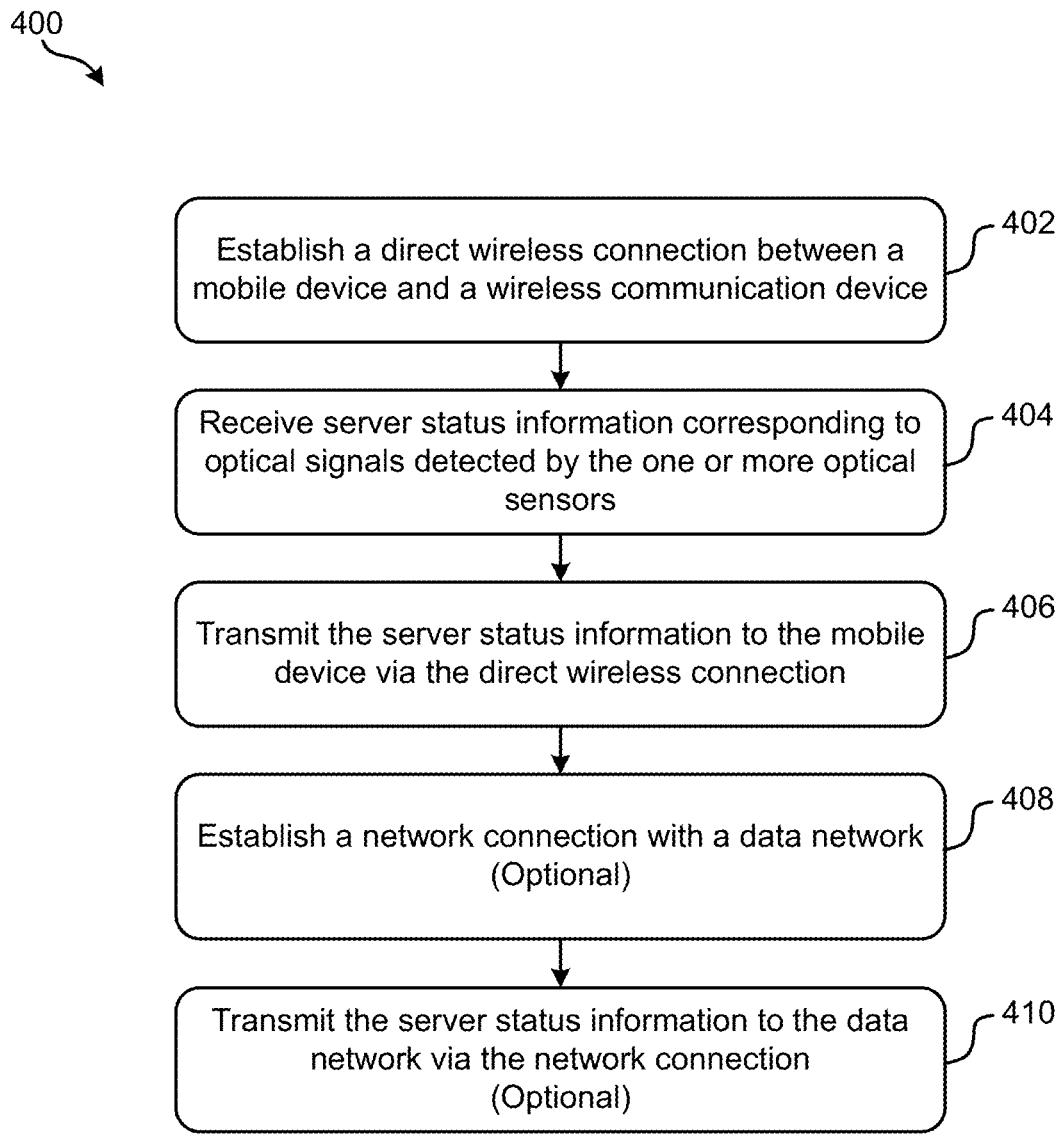
FIG. 4 is a flowchart of a method, according to one embodiment.

As shown in FIG. 4, operation 402 of method 400 includes the wireless communication device establishing a direct wireless connection between a mobile device and the wireless communication device. As shown in FIGS. 3A-3B, although the wireless communication device 318 is coupled to the optical sensors 310 by a physical or wireless electrical connection, the wireless communication device 318 is also preferably operable to establish a direct wireless connection with another device. As previously mentioned, a direct wireless connection may be established between a mobile device nearby and the wireless communication device using any desired protocol, e.g., including Bluetooth, near field communication, Wi-Fi Direct, etc.

Moreover, operation 404 includes the wireless communication device receiving server status information corresponding to optical signals detected by the one or more optical sensors. The optical sensors are preferably positioned such that they are operable to detect optical signals from one or more optical sources of one or more servers, e.g., as depicted in FIG. 3A. Moreover, the server status information may be received from the optical sensors, and/or integrated circuits coupled thereto, via the physical or wireless electrical connection extending between the wireless communication device, the optical sensors, and/or the integrated circuits.

As described above, optical signals detected by optical sensors and/or representations of such optical signals may be decoded to determine the server status information corresponding thereto. Thus, the server status information received in operation 404 may be determined by decoding the detected optical signals. According to some approaches, one or more integrated circuits coupled to the one or more optical sensors may be used to decode the detected optical signals. Thus, each of the one or more integrated circuits in a given embodiment may be operable to form the server status information by decoding representations of the optical signals detected by a respective optical sensor.

In some alternative embodiments, rather than the wireless communication device receiving server status information in operation 404, digital or analog representations of the detected optical signals may be received. Again, the wireless communication device, or a controller coupled thereto, may be used to decode digital or analog representations of the detected optical signals in order to determine the corresponding server status information.

With continued reference to FIG. 4, method 400 further includes the wireless communication device transmitting the server status information to the mobile device via the direct wireless connection. See operation 406. Once the mobile device receives the server status information, the mobile device may be operable to use the server status information to manage the servers which correspond to the server status information, e.g., see operation 508 below.

Furthermore, optional operation 408 includes the wireless communication device establishing a network connection with a data network, while optional operation 410 includes the wireless communication device transmitting the server status information to the data network (or a device coupled thereto) via the network connection. Again, the wireless communication device may be part of a network access point with direct wireless connection capability in some embodiments. Thus, the wireless communication device may establish a network connection to a data network for sending the server status information to a device (e.g., computer) via the data network.

Figure 5:
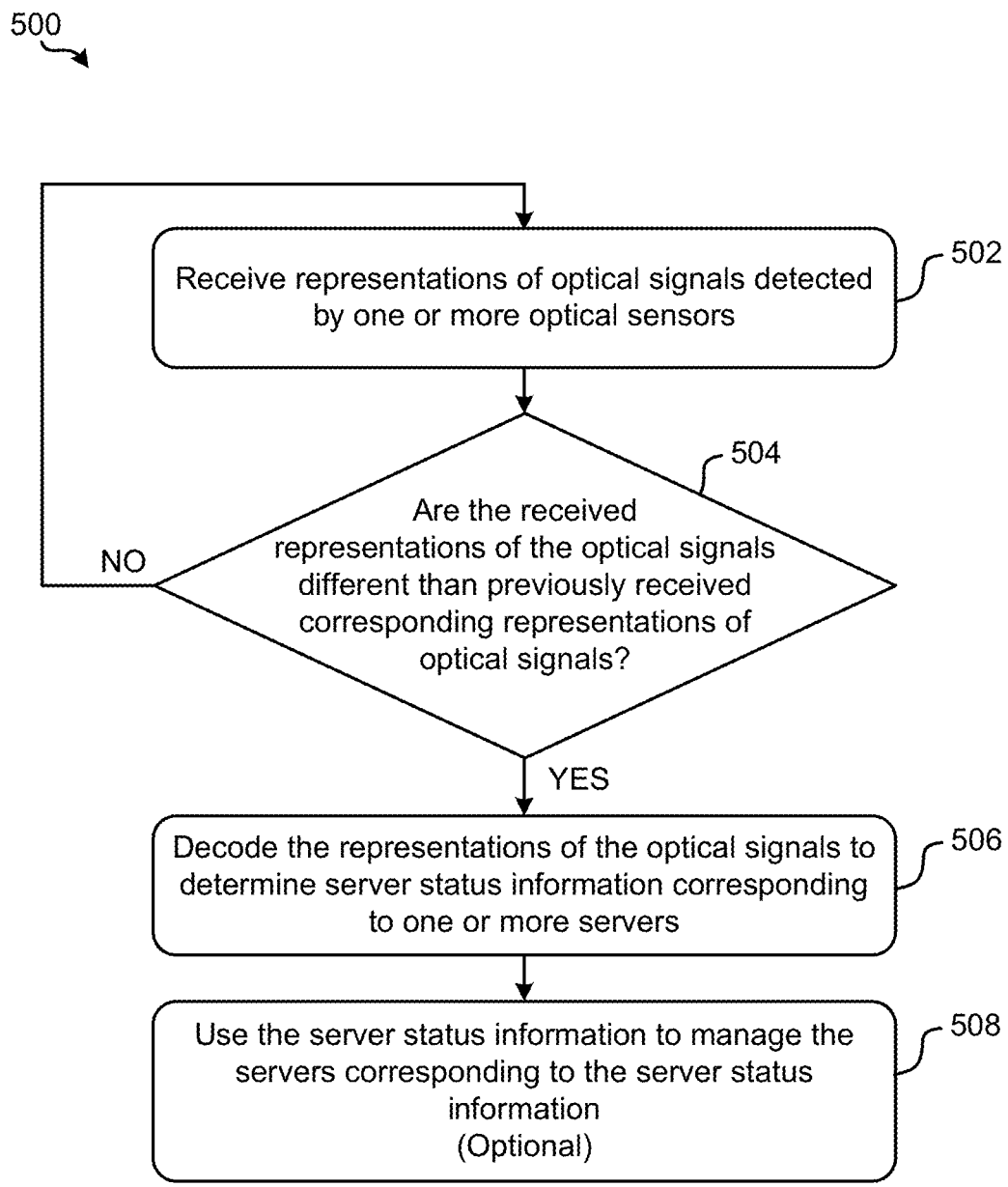
FIG. 5 is a flowchart of a method, according to one embodiment.

Looking to FIG. 5, a flowchart of a method 500 is shown according to one embodiment. It should be noted that the operations included in method 500 may be performed by various ones of the devices (e.g., components) included in system 300 of FIGS. 3A-3B. For example, any one or more of the processes included in method 500 may be performed by an integrated circuit, a wireless communication device, a mobile device, a computer coupled to a data network via a network connection, etc., depending on the desired embodiment. However, the method 500 may be performed in accordance with the present invention in any of the environments depicted in FIGS. 1-3B, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes the device receiving representations of optical signals detected by one or more optical sensors. The representations of the optical signals in this and any other embodiment may be any type of signal, data, etc. derived from the output of the one or more optical sensors. As previously noted, a digital or analog representation of the optical signals detected by the one or more optical sensors may be received. Moreover, in some approaches, such representations of the optical signals may represent the raw optical signal, e.g., frequency, number of flashes, wavelength, duration, etc. In other approaches, the signal from the optical sensors may be converted to other forms of data that represent the optical signals originally detected by an optical sensor, e.g., a digital code that corresponds to the optical signals as derived from a table.

New representations of optical signals detected by one or more optical sensors may be received periodically according to a given frequency, in response to the optical sensors receiving a request from a user, automatically upon the optical sensors detecting a change in the optical signals displayed by optical sources on the servers, etc. Accordingly, some approaches may implement software which periodically scans for changes in the representations of the optical signals received.

Decision 504 includes the device determining whether the received representations of the optical signals are different than previously received corresponding representations of optical signals. Any number of previously received representations of optical signals may be stored in memory and may be compared to newly received corresponding representations of optical signals. Thus, according to one approach, the most recent previously received representations of optical signals (the last received representations of optical signals) may be compared to newly received representations of optical signals. If the newly received representations of optical signals matches the last representations of optical signals, it may be determined that the statuses of the servers have not changed, and no additional action may be called for. Accordingly, method 500 returns to operation 502 in response to determining that the received representations of the optical signals are not different than previously received corresponding representations of optical signals.

However, method 500 proceeds to operation 506 in response to determining that the received representations of the optical signals are different than previously received corresponding representations of optical signals. As shown, operation 506 includes the device decoding the representations of the optical signals to determine server status information corresponding to one or more servers. Depending on the device, the decoding may be performed differently. According to some approaches, the device may be a wireless communication device, and the decoding is performed by a processor coupled to the wireless communication device by a physical electrical connection. In other approaches, the device may be a mobile device, and the decoding may be performed by a controller integrated with the mobile device. The controller may be operable to implement software capable of decoding the representations of the optical signals received.

Moreover, optional operation 508 includes the device using the server status information to manage the servers corresponding to the server status information. As previously mentioned, once the server status information has been determined, it is preferably used to decide what action should be taken with regard to one or more of the servers. For instance, if server status information is received which indicates that one of the servers coupled to a storage drive is experiencing a given error, appropriate action may be taken to correct the identified error. According to an example, a mobile device may receive server status information indicating that the power supply to a server has failed. The mobile device may thereby display a warning message to a user informing the user of the power supply failure along with repair instructions, a service technician phone number, preventative steps to prevent further errors, etc. According to another example, a wireless communication device may receive server status information indicating that one of the servers is due for a software update. The wireless communication device may thereby send a software update request to a computer via a network connection to a data network and/or a nearby electrical device coupled to the wireless communication device via a wireless connection.

Various embodiments described herein are able to efficiently manage and normalize server status information which corresponds to optical sources on the server interfaces. This may be particularly desirable in datacenters that implement servers which correspond to a number of different vendors in a rack, as server interfaces are often vendor specific. Some of the embodiments described herein may also be useful in datacenters that wish to simply bypass management of the servers themselves altogether while still maintaining minimalistic server status management.

Some embodiments herein may be used to manage the status of multiple servers in a rack by implementing a novel status harvesting system architecture which is able to detect optical signals displayed on an outer surface of one or more servers, regardless of a vendor of each of the servers. Moreover, these optical signals (and the server status information corresponding thereto) may be acquired without using a BMC which may or may not be included in each of the respective servers, and without implementing any server firmware that is vendor specific. This is particularly desirable as various embodiments described herein are able to avoid any dependency on server firmware levels, as the firmware may de-feature the server status information detection system (inadvertently) and/or be used to potentially mask issues.

It follows that various embodiments described herein may enable an improved process of managing servers over conventional implementations. By efficiently detecting and decoding the optical signals from multiple light indicators on various servers in a given rack as described herein, an improved manner of managing multiple servers is achieved. Moreover, wireless connections to systems implementing such optical sensor detection and decoding may further introduce the desired ability to manage multiple servers in a rack without physically inspecting each one, without relying on a server BMC and/or server BMC firmware.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a wireless communication device operable to establish a wireless connection and transmit server status information over the wireless connection; and
an optical sensor operable to detect optical signals from an optical source of a server,
wherein the wireless communication device and the optical sensor are coupled together by a physical or wireless connection.

2. The system as recited in claim 1, wherein the optical sensor includes a photo sensing diode.

3. The system as recited in claim 1, wherein the optical sensor is coupled to an integrated circuit, wherein the integrated circuit is able to decode representations of the optical signals detected by the optical sensor, wherein the optical signals represent server status information which corresponds to the server.

4. The system as recited in claim 1, wherein the optical sensor is coupled to an inner surface of an enclosure adjacent the server.

5. The system as recited in claim 1, wherein the wireless connection is a direct wireless connection, wherein the wireless communication device is able to establish the direct wireless connection using a protocol, wherein the protocol is selected from a group consisting of: Bluetooth, near field communication and Wi-Fi Direct.

6. The system as recited in claim 1, wherein the wireless communication device is part of a network access point with wireless connection capability, wherein the network access point is coupled to a data network via a network connection for sending the server status information to a computer via the data network.

7. A computer program product comprising a non-transitory computer readable storage medium, the computer readable storage medium having program code stored thereon, the program code executable by a computer to cause the computer to perform a process comprising:
establishing, by a wireless communication device, a wireless connection between a mobile device and the wireless communication device, the wireless communication device being coupled to an optical sensor;
receiving, by the wireless communication device, server status information corresponding to optical signals detected by the optical sensor; and
transmitting, by the wireless communication device, the server status information to the mobile device via the wireless connection,
wherein the optical sensor is positioned to detect optical signals from an optical source of a server.

8. The computer program product as recited in claim 7, wherein the optical sensor includes a photo sensing diode.

9. The computer program product as recited in claim 7, wherein the optical sensor is coupled to an integrated circuit, wherein the integrated circuit is able to form the server status information by decoding representations of the optical signals detected by the optical sensor.

10. The computer program product as recited in claim 7, wherein the optical sensor is coupled to a server rack supporting the server.

11. The computer program product as recited in claim 7, wherein the optical sensor is coupled to an inner surface of an enclosure adjacent the server.

12. The computer program product as recited in claim 7, wherein the wireless connection is a direct wireless connection, wherein the direct wireless connection is established using a protocol, wherein the protocol is selected from a group consisting of: Bluetooth, near field communication and Wi-Fi Direct.

13. The computer program product as recited in claim 7, wherein the wireless communication device is part of a network access point with wireless connection capability, wherein the network access point is coupled to a data network via a network connection for sending the server status information to a computer via the data network.

14. The computer program product as recited in claim 7, wherein the wireless communication device is coupled to the optical sensor by a physical or wireless electrical connection.

15. A computer program product comprising a non-transitory computer readable storage medium, the computer readable storage medium having program code stored thereon, the program code executable by a computer to cause the computer to perform a process comprising:
receiving, by a device, representations of optical signals detected by an optical sensor; and
decoding, by the device, the representations of the optical signals to determine server status information corresponding to a server,
wherein the optical sensor is positioned to detect optical signals from an optical source of the server.

16. The computer program product as recited in claim 15, wherein the device includes a wireless communication device, wherein the wireless communication device is coupled to the optical sensor by a physical or wireless connection, wherein the representations of the optical signals are received from the optical sensor via the physical or wireless connection.

17. The computer program product as recited in claim 15, wherein the device is an integrated circuit, wherein the integrated circuit is coupled to the optical sensor by a physical electrical connection, wherein the representations of the optical signals are received from the integrated circuit via the physical electrical connection.

18. The computer program product as recited in claim 15, wherein the device is a mobile device, wherein the representations of the optical signals are received from a wireless communication device via a wireless connection between the mobile device and the wireless communication device.

19. The computer program product as recited in claim 15, the program code executable by the computer to cause the computer to perform the process comprising:
determining, by the device, whether the received representations of the optical signals are different than previously received corresponding representations of optical signals,
wherein the decoding is performed in response to determining that the received representations of the optical signals is different than the previously received corresponding representations of optical signals.

20. The computer program product as recited in claim 18, wherein the wireless connection is a direct wireless connection, wherein the direct wireless connection corresponds to a protocol, wherein the protocol is selected from a group consisting of: Bluetooth, near field communication and Wi-Fi Direct.

* * * * *